(12) United States Patent
Fumio

(10) Patent No.: US 8,863,515 B2
(45) Date of Patent: Oct. 21, 2014

(54) ROTATION DRIVE DEVICE

(76) Inventor: Fumio Fumio, Shizuoka (JP)

( * ) Notice: Subject to any disclaimer, the term of this patent is extended or adjusted under 35 U.S.C. 154(b) by 183 days.

(21) Appl. No.: 13/555,077

(22) Filed: Jul. 20, 2012

(65) Prior Publication Data

US 2012/0285168 A1  Nov. 15, 2012

(30) Foreign Application Priority Data

Jan. 20, 2010 (JP) ................................. 2010-010492

(51) Int. Cl.
*F03B 7/00* (2006.01)

(52) U.S. Cl.
USPC ........................................................... 60/639

(58) Field of Classification Search
USPC .................................................. 60/639, 640
See application file for complete search history.

(56) References Cited

U.S. PATENT DOCUMENTS

| 2,499,715 A | * | 3/1950 | Blevins | 60/640 |
| 3,651,635 A | * | 3/1972 | Clay | 60/640 |
| 4,132,223 A | * | 1/1979 | Reddell | 126/601 |
| 4,246,756 A | * | 1/1981 | West | 60/640 |
| 4,440,427 A | * | 4/1984 | Felton | 290/54 |

FOREIGN PATENT DOCUMENTS

| JP | 4011365 | 9/2003 |
| JP | 2008-223742 | 9/2008 |

* cited by examiner

*Primary Examiner* — Hoang Nguyen
(74) *Attorney, Agent, or Firm* — Keith H. Orum; Orum & Roth, LLC

(57) ABSTRACT

In a rotation drive device (10), each of rotating units (20) has a swing arm (23) which is supported so as to be swingable around a swing center axis (23A) provided in a support table (22), a weight (24) is provided at a position at which a length of an arm from the swing center axis (23A) of the swing arm (23) is longer, and a connection point in a fluid cylinder (25) side is provided at a position at which the length of the arm from the swing center axis (23A) is shorter.

4 Claims, 9 Drawing Sheets

ROTATION DRIVE DEVICE

TECHNICAL FIELD

The present invention relates to a rotation drive device which rotates a rotating shaft by utilizing a fluid pressure such as compressed air or the like, and a gravitational force, and further can drive a subject to be rotated.

BACKGROUND ART

Conventionally, in a rotation drive device for obtaining a rotating force without using an engine or a motor, there have been a structure which is disclosed in patent document 1.

A rotation drive device described in the patent document 1 has a rotating shaft which is pivotally supported to a stand, a rotating table which is fixed onto the rotating shaft, and a plurality of rotating units which is provided at a plurality of positions which are spaced along a rotating direction on the rotating table. Each of the rotating units is provided with a weight which is provided on the rotating table so as to be linearly reciprocated in a direction which is orthogonal to the rotating shaft, and a fluid cylinder which linearly reciprocates the weight in the direction which is orthogonal to the rotating shaft. It is structured such as to change a position of the weight of each of the rotating units in a radial direction with respect to the rotating shaft, by sequentially supplying a fluid from a fluid supply source to a fluid cylinder of each of the rotating units by a rotary type switch valve which is provided on the rotating shaft, and rotate the rotating table and the rotating shaft on the basis of a fluctuation of a rotating moment which a gravitational force applied to the weight acts around the rotating shaft.

PRIOR ART DOCUMENT

Patent Document

Patent Document 1: Japanese Patent No. 4011365

SUMMARY OF THE INVENTION

Problem to be Solved by the Invention

The following problems exist in the rotation drive device described in the patent document 1.

(1) Each of the rotating units linearly moves the weight in the direction which is orthogonal to the rotating shaft by the fluid cylinder. Accordingly, a stroke of the fluid cylinder comes to a change of the position in the radial direction of the weight as it is. In order to enlarge the rotating moment which the weight applies to the rotating shaft and obtain a great rotating force, it is necessary to enlarge the change of the position in the radial direction of the weight, and it is simultaneously necessary to enlarge the stroke of the fluid cylinder. Accordingly, a fluid cylinder having a large stroke is necessary.

(2) Each of the rotating units is structured such as to linearly move the weight against the gravitational force by the fluid cylinder, and in the case of making the weight heavy for enlarging the rotating moment which the weight applies to the rotating shaft and obtaining a great rotating force, a fluid cylinder having a large output is necessary.

An object of the present invention is to enlarge a rotating moment which a weight of each of rotating units applies to a rotating shaft and obtain a great rotating force, while downsizing a stroke and an output of a fluid cylinder, in a rotation drive device which has a plurality of rotating units which can obtain a rotating force by changing a position in a radial direction of the weight with respect to the rotating shaft by the fluid cylinder.

Means for Solving the Problem

In accordance with one embodiment of the present invention, there is provided a rotation drive device comprising a rotating shaft which is pivotally supported to a stand. A rotating table is fixed onto the rotating shaft. A plurality of rotating units are provided at a plurality of positions spaced along a rotating direction on the rotating table. Each of the rotating units includes a support table which is supported to the rotating table, a weight which is supported to the support table, and a fluid cylinder which is attached to the support table and makes a radial position of the weight with respect to the rotating shaft controllable. The rotation drive device changes the radial position of the weight in each of the rotating units by sequentially supplying a fluid from a fluid supply source to the fluid cylinder of each of the rotating units, and rotating the rotating table and the rotating shaft on the basis of a fluctuation of a rotating moment which a gravitational force acting on the weight applies around the rotating shaft. Each of the rotating units has a swing arm which is supported so as to be swingable around a swing center axis provided in the support table. The weight is provided at a position at which a length of an arm of the swing arm from the swing center axis is longer, and a connection point in the fluid cylinder side is provided at a position at which the length of the arm from the swing center axis is shorter. The support table provided with the swing center axis of the swing arm is supported so as to be swingable around an oscillation support axis which is provided in a base table attached to the rotating table and is orthogonal to the rotating shaft. The swing center axis of the swing arm provided in the support table is swingable at a fixed angle to a side to which a gravitational force acting on the weight is applied, in both sides with respect to a neutral position positioned on a surface which is orthogonal to the rotating shaft.

In accordance with another embodiment of the present invention, in each of the rotating units, the fluid from the fluid supply source is controlled so as to be supplied to the fluid cylinder of each of the rotating units, in such a manner that a timing A at which the swing arm starts swinging in a direction of protruding the weight from a minimum radial position toward a maximum radial position with respect to the rotating shaft comes to a timing at which the swing arm of the rotating unit and the weight are near a horizontal surface including the rotating shaft, and a vertical position of the weight begins to become lower in a subsequent swinging process in the direction of the swing arm. In each of the rotating units, the fluid from the fluid supply source is controlled so as to be supplied to the fluid cylinder of each of the rotating units, in such a manner that a weight retraction start timing B which starts swinging in a direction of retracting the swing arm from the maximum radial position toward the minimum radial position comes to a timing at which the swing arm of the rotating unit and the weight are near the horizontal surface including the rotating shaft, and the vertical position of the weight begins to become lower in the subsequent swinging process in the direction of the swing arm.

In accordance with another embodiment of the present invention, the base table supporting the swing arm and the support table is attached in such a manner as to be tiltable from a reference position at which the swing arm is swingably along the surface including the rotating shaft to a forward tilting position which moves forward at a fixed angle in a rotating direction, around a tilt support axis which is provided in the rotating table and is along the rotating shaft.

Effects (a) Each of the rotating units swings and moves the leading end weight of the swing arm by the fluid cylinder which is attached to the support table on the rotating table, and controls the radial position of the weight with respect to the rotating shaft. Further, the weight is provided at the position at which the length R of the arm from the swing center axis of the swing arm is longer, and the connecting point in the fluid cylinder side is provided at the position at which the length r of the arm from the swing center axis is shorter. Therefore, a stroke of the fluid cylinder is enlarged so as to come to a change of the radial position of the weight. It is possible to enlarge the change of the radial position of the weight while downsizing the stroke of the fluid cylinder, and it is further possible to enlarge the rotating moment which the weight applies to the rotating shaft, whereby it is possible to obtain a great rotating force.

(b) Each of the rotating units is structured such as to swing and move the weight around the swing center axis of the swing arm by the fluid cylinder, and the weight obtains a centrifugal force in the process of its swing movement. In accordance with this, the centrifugal force mentioned above is added to the thrust force caused by the fluid pressure of the fluid cylinder, as a moving force source of the weight. On the basis of the addition of the centrifugal force, it is possible to move the heavy weight while using the fluid cylinder having a small output, and it is further possible to enlarge the rotating moment which the weight applies to the rotating shaft, whereby it is possible to obtain a great rotating force.

(c) The swing center axis of the swing arm provided in the support table can be oscillated at the fixed angle to the side to which the gravitational force acting on the weight is applied, in both sides with respect to the neutral position which is positioned on the surface which is orthogonal to the rotating shaft. Accordingly, in each of the rotating units, in the case that the oscillation support axis of the support table exists in the side of the gravitational force acting region in which the weight of the swing arm comes down to the vertically lowest portion along the gravitational force utilizing rotating direction N from the vertically highest portion on the rotating track of the rotating unit, with respect to the vertical surface including the rotating shaft, the swing center axis of the swing arm provided in the support table oscillates at the angle $\alpha_0$ to the side to which the gravitational force acting on the weight is applied, from the neutral position on the surface which is orthogonal to the rotating shaft. If the rotating unit protrudes by weight as mentioned above so as to come close to the start timing A in the oscillating state of the swing center axis, the weight is exposed to the swing auxiliary force caused by the gravitational force at the weight protrusion start timing A$\alpha$ before they run into the weight protrusion start timing A (before at the rotating angle $\alpha$ the weight protrusion start timing A), and starts a free-fall along the swing surface which forms the downward gradient (the head drop Ha) with respect to the horizontal surface around the swing center axis. At this time, if the appropriate protruding fluid pressure is applied to the fluid cylinder, the free-fall mentioned above of the weight is started from the weight protrusion start timing A$\alpha$ before the swing arm of the rotating unit and the weight run into the weight protrusion start timing A, thereby quickening the weight protrusion start timing A. Since the protruding start timing A of the weight is quickened regardless of the thrust of the fluid cylinder, it is possible to enlarge the rotation energizing angle range La of the rotating shaft in which the rotating force can be obtained by the rotating moment which the weight is protruded to the maximum radial position in the gravitational force acting region so as to apply to the rotating shaft, and it is possible to improve the gravitational force utilization ratio of the rotation drive device.

Further, even in the case that the weight is in the side of the opposite gravitational force acting region in which the weight is lifted up from the vertically lowest portion toward the vertically highest portion, with respect to the vertical surface in which the oscillation support axis of the support table includes the rotating shaft, in each of the rotating units, the swing center axis of the swing arm provided in the support table is oscillated at the angle $\beta_0$ from the neutral position on the surface which is orthogonal to the rotating shaft to the side to which the gravitational force acting on the weight is applied. In this oscillation state of the swing center axis, if the rotating unit comes close to the weight retraction start timing B mentioned above, the weight is exposed to the swing auxiliary force caused by the gravitational force at the weight retraction start timing B$\beta$ before they run into the weight retraction start timing B (before at the rotating angle $\beta$ the weight retraction start timing B), and starts the free-fall along the swing surface which forms the downward gradient (the head drop Hb) with respect to the horizontal surface around the swing center axis. At this time, if the appropriate retraction fluid pressure is applied to the fluid cylinder, the free-fall mentioned above of the weight starts from the weight retraction start timing B$\beta$ before the swing arm of the rotating unit and the weight run into the weight retraction start timing B, thereby quickening the weight retraction start timing B mentioned above. Since the retraction start timing B of the weight is quickened regardless of the thrust of the fluid cylinder, it is possible to reduce the rotating resistance angle range Lb of the rotating shaft in which the rotating resistance force is applied to the rotating shaft while keeping the weight be protruded to the maximum radial position in the opposite gravitational force acting region, and it is possible to improve the gravitational force utilization ratio of the rotation drive device.

(d) In each of the rotating units, the timing A at which the swing arm starts swinging the weight in the direction of protruding toward the maximum radial position from the minimum radial position with respect to the rotating shaft, while minimizing the thrust of the fluid cylinder is near the horizontal surface in which the swing arm of the rotating unit and the weight include the rotating shaft, and the timing at which the vertical position of the weight begins to be lower in the subsequent swinging process of the swing arm in the direction (the timing which can receive the swing auxiliary force caused by the gravitational force of the weight) is good.

(e) In each of the rotating units, the weight retraction start timing B at which the swing arm is started swinging in the direction of retracting toward the minimum radial position from the maximum radial position on the basis of the minimum thrust of the fluid cylinder is near the horizontal surface in which the swing arm of the rotating unit and the weight include the rotating shaft, and the timing at which the vertical position of the weight begins to be lower in the subsequent swinging process of the swing arm in the direction (the timing which can receive the swing auxiliary force caused by the gravitational force of the weight) is good.

(f) The base table supporting the swing arm and the support table is attached in such a manner as to be tiltable to the forward tilting position which moves forward at the fixed angle in the rotating direction, from the reference position at which the swing arm is swingably along the surface including the rotating shaft, around the tilting motion support axis along the rotating shaft, the tilting motion support axis being provided in the rotating table. Accordingly, in the case that the weight is in the side of the gravitational force acting region mentioned above, in each of the rotating units, the base table which supports the swing arm and the support table is tilted to the forward tilting position from the reference position. In accordance with this, at the weight protrusion start timing A$\theta$ before the rotating unit runs into the weight protrusion start timing A$\alpha$ mentioned above (before at the rotating angle $\theta$ the weight protrusion start timing A$\alpha$), the vertical position of the weight begins to be lower in the subsequent swinging process in the weight protruding direction of the swing arm, is exposed to the swing auxiliary force caused by the gravitational force of the weight, and can start the free-fall. Accordingly, at this time, if the appropriate protrusion fluid pressure is applied to the fluid cylinder, the free-fall mentioned above of the weight is started from the weight protrusion start timing A$\theta$ before the swing arm of the rotating unit and the weight run into the weight protrusion start timing A$\alpha$, thereby further quickening the weight protrusion start timing A mentioned above. Since the protrusion start timing A of the weight is further quickened regardless of the thrust of the fluid cylinder, it is possible to further enlarge the rotation energizing angle range La of the rotating shaft in which the rotating force can be obtained by the rotating moment which the weight is protruded to the maximum radial position in the gravitational force acting region so as to apply to the rotating shaft, and it is possible to further improve the gravitational force utilization ratio of the rotation drive device.

BEST MODE FOR CARRYING OUT THE INVENTION

Figure 1:
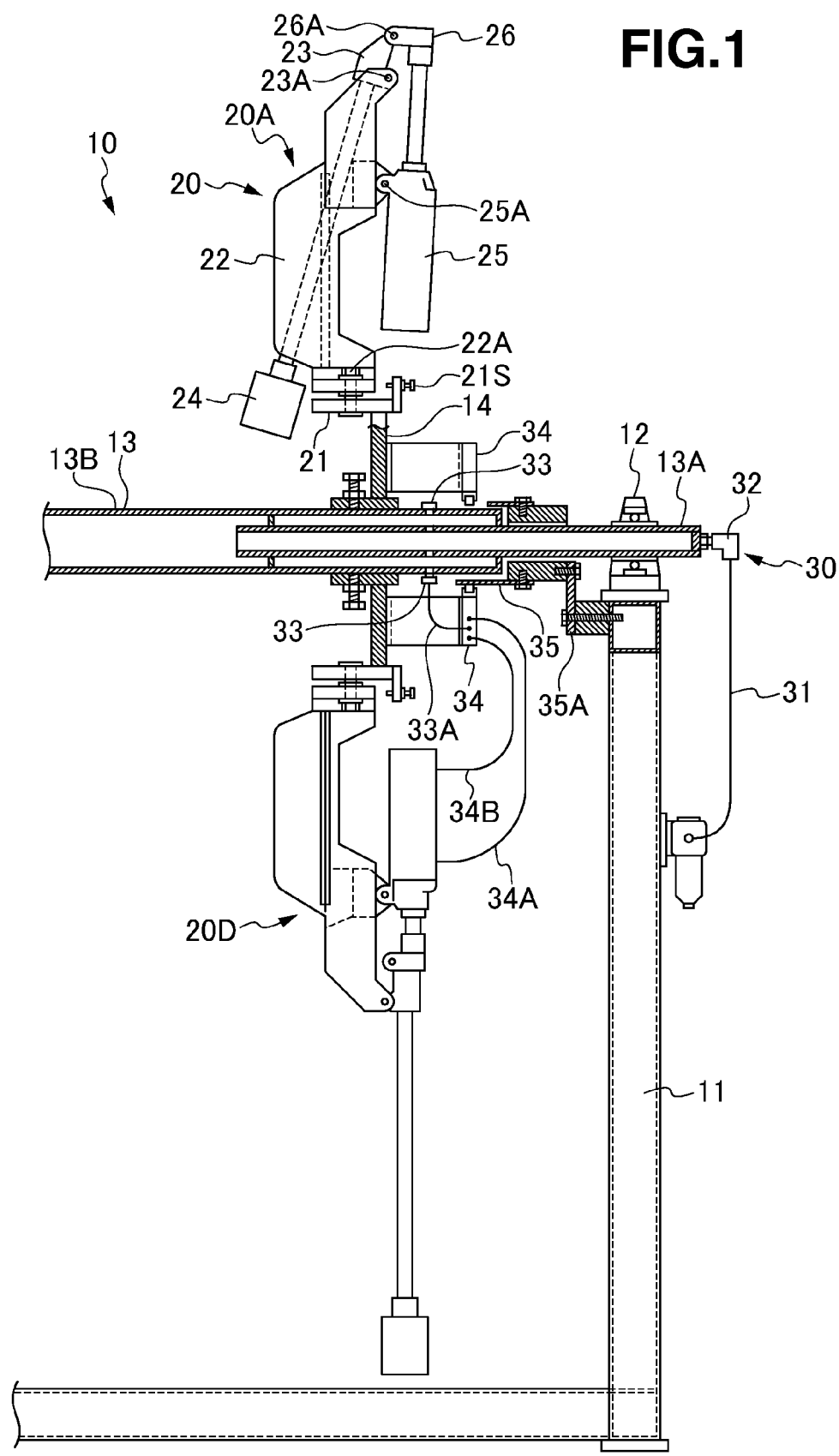
FIG. 1 is a whole front elevational view showing a rotation drive device.
Figure 2:
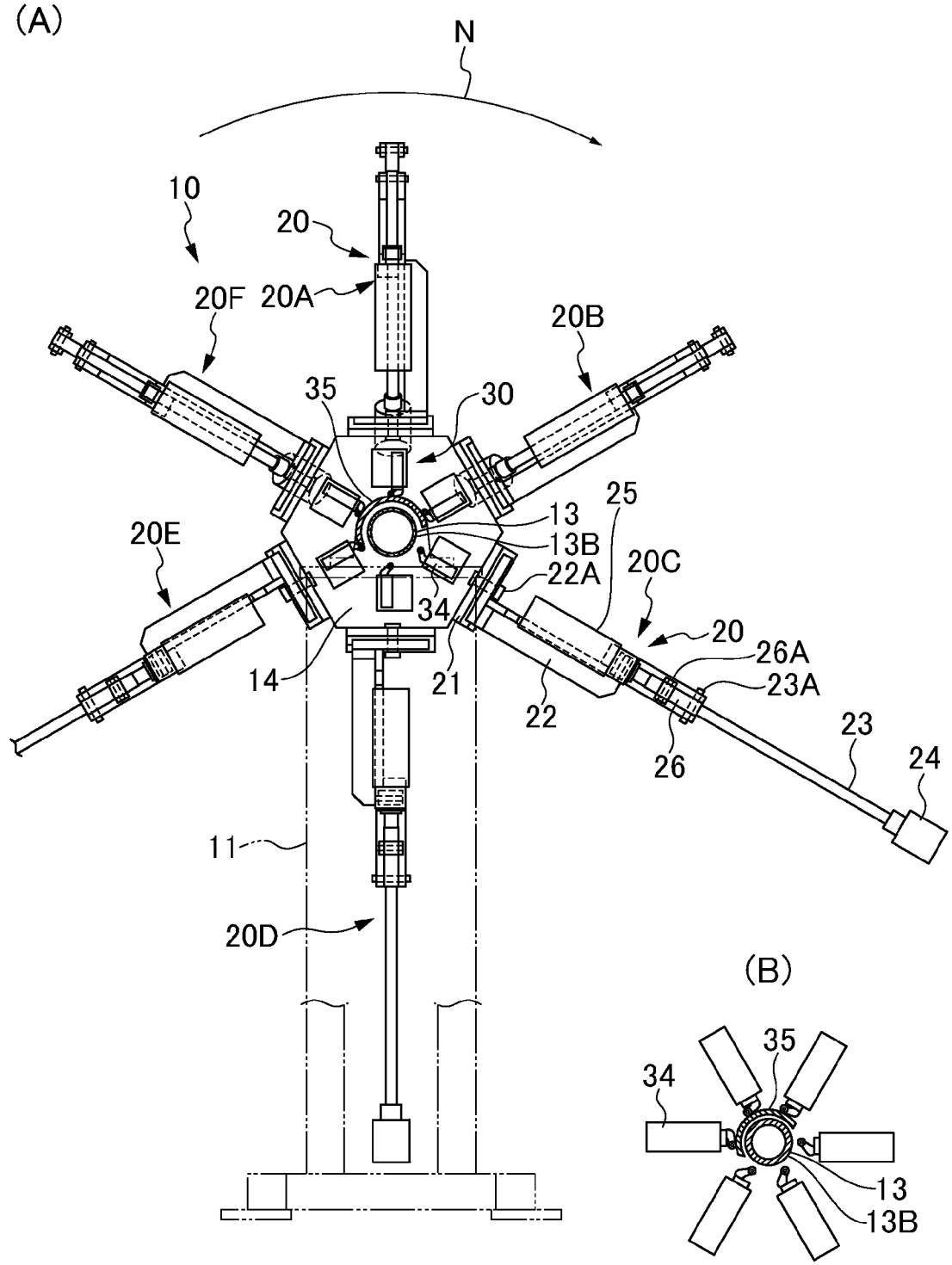
FIG. 2 is a whole side elevational view of FIG. 1.
Figure 2:
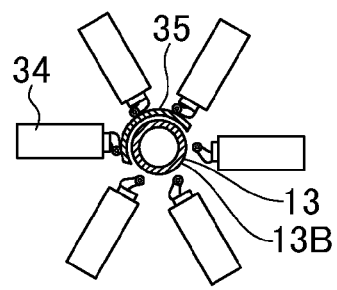

A rotation drive device 10 has a rotating shaft 13 which is pivotally supported to right and left bearings 12 (only one of the right and left is shown) which are provided in a stand 11, as shown in FIG. 1 and FIG. 2. The rotating shaft 13 is constructed by right and left small-diameter hollow shafts 13A which are supported to the right and left respective bearings 12, and large-diameter hollow shafts 13B which are coaxially attached and fixed to the right and left small-diameter hollow shafts 13A so as to be supported in both ends thereof. The rotation drive device 10 is structured such that a rotating table 14 which is formed as a tabular, as a hexagonal shape in the present embodiment, is fixed to an outer peripheral portion of the large-diameter hollow shaft 13B of the rotating shaft 13, and has six rotating units 20 (20A to 20F) which are provided at a plurality of positions which are spaced along the rotating direction on the rotating table 14, at six positions so as to be spaced at 60 degree in the present embodiment.

Figure 3:
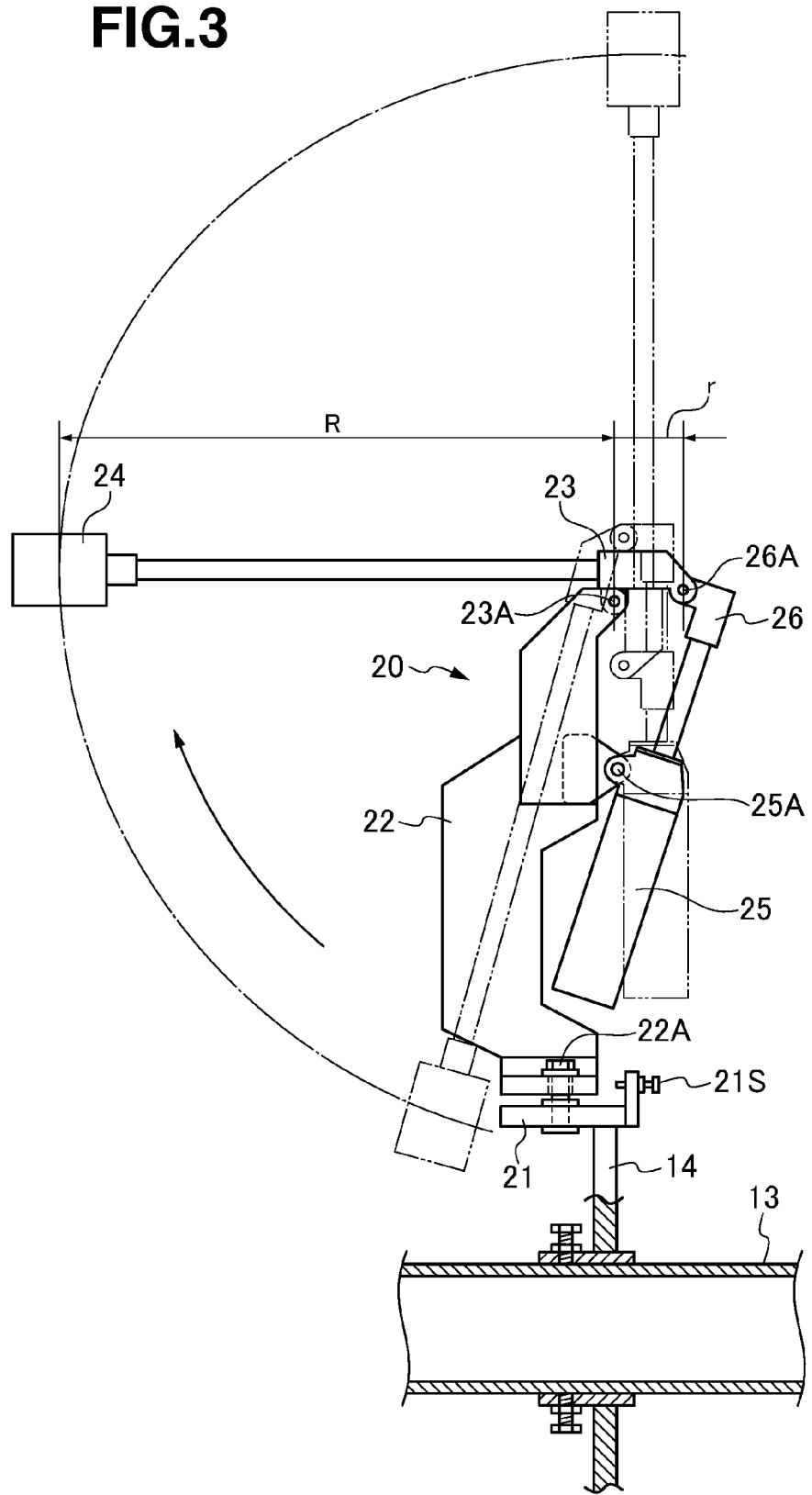
FIG. 3 is a front elevational view showing a rotating unit.

Each of the rotating units 20 is provided with a support table 22 which is supported to a base table 21 fixedly attached to the rotating table 14 in the manner mentioned later, a weight 24 which is provided in a swing arm 23 supported to the support table 22 in the manner mentioned later, and a fluid cylinder 25 such as an air cylinder or the like which is attached to the support table 22 in the manner mentioned later so as to swing the swing arm 23 and can control a radial position of the weight 24 with respect to the rotating shaft 13, as shown in FIG. 3.

At this time, each of the rotating units 20 supports the swing arm 23 so as to be swingable around a swing center axis 23A provided in the support table 22, is fixedly provided with the weight 24 at a position at which a length R of an arm from the swing center axis 23A of the swing arm 23 is longer, and pivotally attaches a connection arm 26 which is fixedly provided in a piston rod 25 of the fluid cylinder 25 at a position at which a length r of an arm from the swing center axis 23A is shorter, by a connecting pin 26A. In this case, the fluid cylinder 25 is trunnion supported to the support table 22 by a support pin 25A. In each of the rotating units 20, the fluid cylinder 25 swings the swing arm 23 from a retraction side to a protrusion side around the swing center axis 23A, minimizes a radial position (a length) of the weight 24 with respect to the rotating shaft 13 in the retraction side, and maximizes the radial position (the length) of the weight 24 with respect to the rotating shaft 13 in the protrusion side.

The rotation drive device 10 has a fluid supply device 30 which sequentially supplies a fluid such as an air or the like from a fluid supply source such as an air compressor or the like to the fluid cylinder 25 of each of the rotating units 20.

The fluid supply apparatus 30 communicates a fluid supply pipe 31 which is connected to the fluid supply source with the small-diameter hollow shaft 13A and the large-diameter hollow shaft 13B of the rotating shaft 13 by a rotating joint 32, and is provided with a fluid supply port 33 at six positions in a peripheral direction corresponding to the respective rotating units 20 in the large-diameter hollow shaft 13B. Further, the fluid supply device 30 has six mechanical valves 34 which are fixed to six positions around the large-diameter hollow shaft 13B of the rotating shaft 13, the six positions corresponding to the respective rotating units 20 on the rotating table 14, and a dog 35 which is attached to the stand 11 via an attaching bracket 35A and is arranged around the large-diameter hollow shaft 13B of the rotating shaft 13 so as to sequentially turn on and off each of the mechanical valves 34.

The mechanical valve 34 of each of the rotating units 20 is connected to the corresponding fluid supply port 33 of the large-diameter hollow shaft 13B by the supply hose 33A, is connected to each of two chambers including a rod side chamber and a piston side chamber which are defined by the piston of the corresponding fluid cylinder 25 by hoses 34A and 34B, and is turned on and off as shown in FIG. 2B by the dog 35. In a 180 degree rotating angle range (a protruding side range P1 in FIG. 4) which is in a protruding side around the rotating shaft 13, in a process that each of the rotating units 20 rotates together with the rotating shaft 13, the mechanical valve 34 is turned off by the dog 35, supplies the fluid which is supplied from the supply device 33A, through the hose 34A to the rod side chamber of the fluid cylinder 25 so as to compress the fluid cylinder 25; swings the swing arm 23 from the retracting side to the protruding side around the swing center axis 23A, and maximizes the radial position of the weight 24 with respect to the rotating shaft 13 (the fluid in the piston side chamber of the fluid cylinder 25 is exhausted from the hose 34B via the mechanical valve 34). On the other hand, in a 180 degree rotating angle range (a retraction side range P2 coming next the P1 in FIG. 4) which exists in a retracting side around the rotating shaft 13, in the process that the each of the rotating units 20 rotates together with the rotating shaft 13, the mechanical valve 34 is turned on by the dog 35, supplies the fluid which is supplied from the supply hose 33A, though the hose 34B to the piston side chamber of the fluid cylinder 25 so as to elongate the fluid cylinder 25, swings the swing arm 23 from the protruding side to the retracting side around the swing center axis 23A, and minimizes the radial position of the weight 24 with respect to the rotating shaft 13 (the fluid in the rod side chamber of the fluid cylinder 25 is exhausted from the hose 34A via the mechanical valve 34).

In this case, in two rotating units 20 (for example, 20A and 20D) which are spaced at 180 degree around the rotating shaft 13, in the case that one rotating unit 20A is in the protrusion side range P1, another rotating unit 20D is in the retraction side range P2 in the opposite side thereto. Accordingly, the piston side chambers (or the rod side chambers) of the fluid cylinders 25 in both the rotating units 20A and 20D may be connected by a hose, and the fluid cylinders 25 of the respective rotating units 20A and 20D and the mechanical valve 34 may be connected only by the fluid supply hose 34A.

Therefore, the rotation drive device 10 basically changes the radial position of the weight 24 in each of the fluid cylinders 20 between the retraction side and the protrusion side mentioned above, by sequentially supplying the fluid from the fluid supply source to the fluid cylinder 25 of each of the rotating units 20, and rotates the rotating shaft 13 and the rotating table 14 on the basis of a fluctuation of a rotating moment which the gravitational force acting on the weight 24 is applied around the rotating shaft 13. In other words, it operates as follows.

(1) The rotating shaft 13 and the rotating table 14 initially stop.

(2) If the fluid supplied to the fluid supply pipe 31 from the fluid supply source is supplied to the rod side chamber of the fluid cylinder 25 from the mechanical valve 34 of each of the rotating units 20 which is at the protrusion side range P1 around the rotating shaft 13, the swing arm 23 swings to the protruding side around the swing center axis 23A. At the same time, the fluid supplied to the fluid supply pipe 31 is supplied to the piston side chamber of the fluid cylinder 25 from the mechanical valve 34 of each of the rotating units 20 which is at the retraction side range P2 around the rotating shaft 13, and the swing arm 23 around the rotating shaft 13 swings to the retracting side around the swing center axis 23A.

Figure 4:
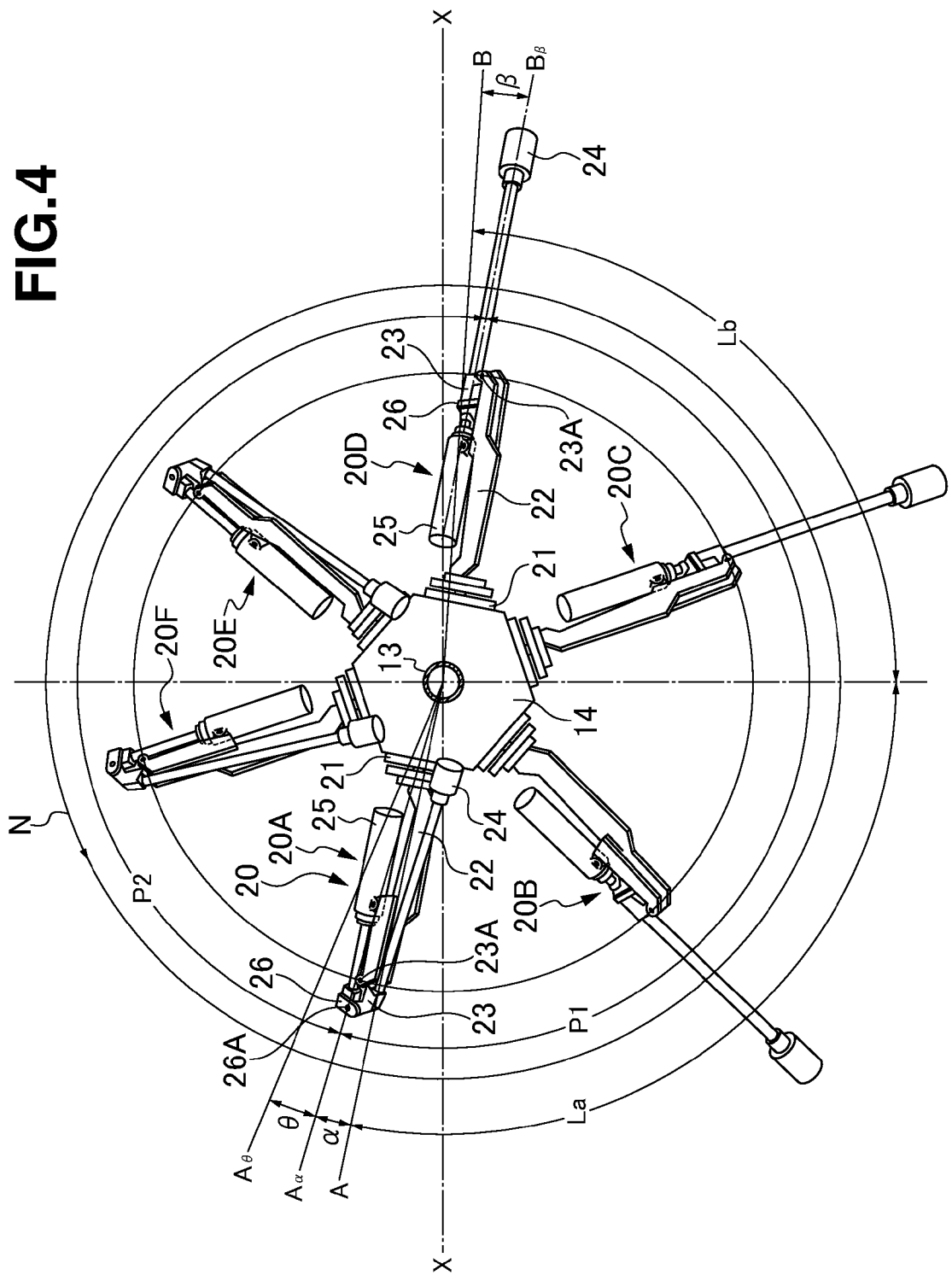
FIG. 4 is a schematic view showing a weight displacement state of the rotation drive device.

At this time, a supply order of the fluid to the rod side chamber or the piston side chamber of the fluid cylinder 25 in each of the rotating units 20 (a fluid supply basic condition to the fluid cylinder 25 in each of the rotating units 20) is set such that a protrusion start timing A of each of the rotating units 20 coming to a base point of the protrusion side range P1 is vertically above a horizontal surface X including the rotating shaft 13 and a retraction start timing B of each of the rotating units 20 coming to a base point of the retraction side range P2 is vertically below the horizontal surface X including the rotating shaft 13, on a rotating track of each of the rotating units 20 along a predetermined rotating direction N of the rotating shaft 13 (a clockwise direction in FIG. 2 and a counterclockwise direction in FIG. 4 around the rotating shaft 13). In accordance with the fluid supply basic condition, a total rotating moment which is applied around the rotating shaft 13 on the basis of the gravitational force acting on the weight 24 of each of the rotating units 20 acts in the N direction around the rotating shaft 13, and the rotating shaft 13 can be further rotated in the rotating direction N mentioned above. FIG. 2 shows a state in which the rotating units 20A to 20C are in the protrusion side range P1, the rotating units 20D to 20F are in the retraction side range P2, and the gravitational force acting on the weights 24 rotates the rotating shaft 13 in the rotating direction N.

(3) Coming next the item (2) mentioned above, the rotating unit 20F moves to the protrusion side range P1 from the retraction side range P2, and the rotating unit 20C moves to the retraction side range P2 from the protrusion side range P1. In accordance with this, in the same manner as the item (2) mentioned above, the total rotating moment which is applied around the rotating shaft 13 on the basis of the gravitational force newly acting on the weight 24 of each of the rotating units 20 is structured such as to rotate the rotating shaft 13 in the rotating direction N mentioned above. For example, if the subject to be rotated is connected to the rotating shaft 13, it is possible to rotationally drive various materials.

Therefore, in accordance with the rotation drive device 10, the following operations and effects can be achieved.

(a) Each of the rotating units 20 swings and moves the leading end weight 24 of the swing arm 23 by the fluid cylinder 25 which is attached to the support table 22 on the rotating table 14, and controls the radial position of the weight 24 with respect to the rotating shaft 13. Further, the weight 24 is provided at the position at which the length R of the arm from the swing center axis 23A of the swing arm 23 is longer, and the connecting point in the fluid cylinder 25 side is provided at the position at which the length r of the arm from the swing center axis 23A is shorter. Therefore, a stroke of the fluid cylinder 25 is enlarged so as to come to a change of the radial position of the weight 24. It is possible to enlarge the change of the radial position of the weight 24 while downsizing the stroke of the fluid cylinder 25, and it is further possible to enlarge the rotating moment which the weight 24 applies to the rotating shaft 13, whereby it is possible to obtain a great rotating force.

(b) Each of the rotating units 20 is structured such as to swing and move the weight 24 around the swing center axis 23A of the swing arm 23 by the fluid cylinder 25, and the weight 24 obtains a centrifugal force in the process of its swing movement. In accordance with this, the centrifugal force mentioned above is added to the thrust force caused by the fluid pressure of the fluid cylinder 25, as a moving force source of the weight 24. On the basis of the addition of the centrifugal force, it is possible to move the heavy weight 24 while using the fluid cylinder 25 having a small output, and it is further possible to enlarge the rotating moment which the weight 24 applies to the rotating shaft 13, whereby it is possible to obtain a great rotating force.

A description will be given below of (i) an oscillation structure of the support table 22 with respect to the base table 21, and (ii) a tilting structure of the base table 21 with respect to the rotating table 14, in each of the rotating units 20 of the rotation drive device 10.

(i) Swing Structure of Support Table 22 with Respect to Base Table 21 (FIG. 1 to FIG. 9)

In the rotation drive device 10, as shown in FIG. 1 to FIG. 4, the support table 22 which is provided with the swing center axis 23A of the swing arm 23 is an oscillation support axis 22A which is provided in the base table 21 attached to the rotating table 14, and is supported so as to be swingable around the oscillation support axis 22A which is orthogonal to the rotating shaft 13. The oscillation support axis 22A of the support table 22 is not only arranged on a radius line of the rotating shaft 13 and is arranged so as to be orthogonal to the rotating shaft 13, but also may be arranged in parallel to the radius line of the rotating shaft 13.

Figure 5:
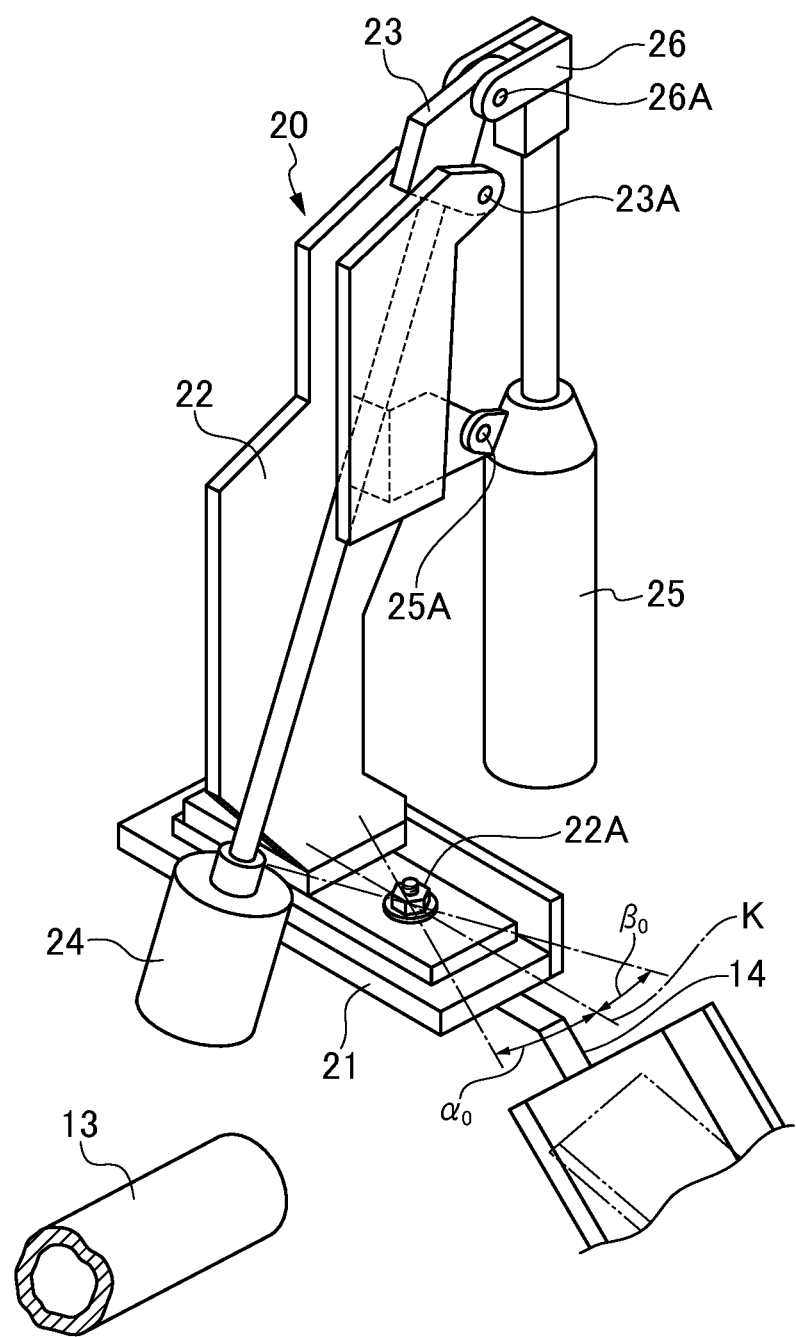
FIG. 5 is a perspective view showing a rotating unit which is positioned in a vertical highest portion around a rotating shaft.

The swing arm 23 and the swing center axis 23A which are provided in the support table 22 are structured such as to be oscillated at a fixed angle ($\alpha_0$ or $\beta_0$) together with the support table 22 in a side to which the gravitational force acting on the weight 24 is applied, in both sides with respect to a neutral position K as shown in FIG. 5 which is positioned on a surface which is orthogonal to the rotating shaft 13 (FIG. 6 to FIG. 9). When the support table 22 oscillates at the angle $\alpha_0$ (FIG. 6 and FIG. 7) or the angle $\beta_0$ (FIG. 8 and FIG. 9) from the neutral position, it comes into contact with a stopper bolt 21S which is provided in the base table 21 so as to be restrained.

In this case, in order to make each of the rotating units 20 of the rotation drive device 10 rotate the rotating shaft 13 in the rotating direction N, it is necessary to set the supply order of the fluid to the rod side chamber or the piston side chamber of the fluid cylinder 25 in each of the rotating units 20, in such a manner that the protrusion start timing A of the swing arm 23 by the fluid cylinder 25 of each of the rotating units 20 is vertically above the horizontal surface X including the rotating shaft 13, and the retraction start timing B of the swing arm 23 by the fluid cylinder 25 of each of the rotating units 20 is vertically below the horizontal surface X including the rotating shaft 13 (a fluid supply basic condition to the fluid cylinder 25) as mentioned above. In each of the rotating units 20, the protrusion start timing A by the fluid cylinder 25 mentioned above which can minimize the thrust of the fluid cylinder 25 while observing the fluid supply basic condition mentioned above to the fluid cylinder 25 is preferably set to a timing at which the swing arm 23 of the rotating unit 20 and the weight 24 are near the horizontal surface including the rotating shaft 13, and the vertical position of the weight 24 begins to become lower in the subsequent swinging process of the swing arm 23 to the direction (a timing which can receive the swing auxiliary force caused by the gravitational force of the weight 24). Further, in each of the rotating units 20, the retraction start timing B by the fluid cylinder 25 mentioned above which can minimize the thrust of the fluid cylinder 25 while observing the fluid supply basic condition mentioned above to the fluid cylinder 25 is preferably set to a timing at which the swing arm 23 of the rotating unit 20 and the weight 24 are near the horizontal surface including the rotating shaft 13, and the vertical position of the weight 24 begins to become lower in the subsequent swinging process of the swing arm 23 to the direction (a timing which can receive the swing auxiliary force caused by the gravitational force of the weight 24).

Figure 6:
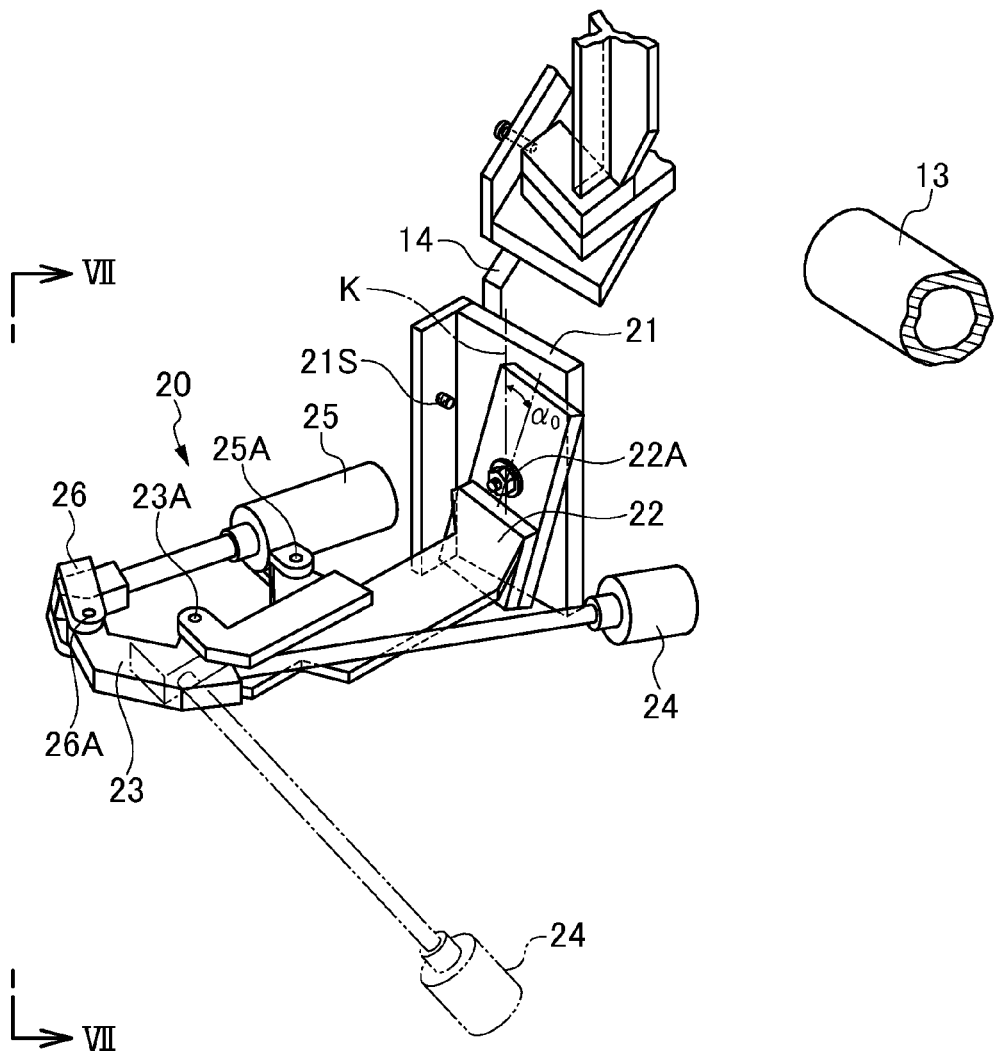
FIG. 6 is a perspective view showing the rotating unit in a weight protruding process.
Figure 7:
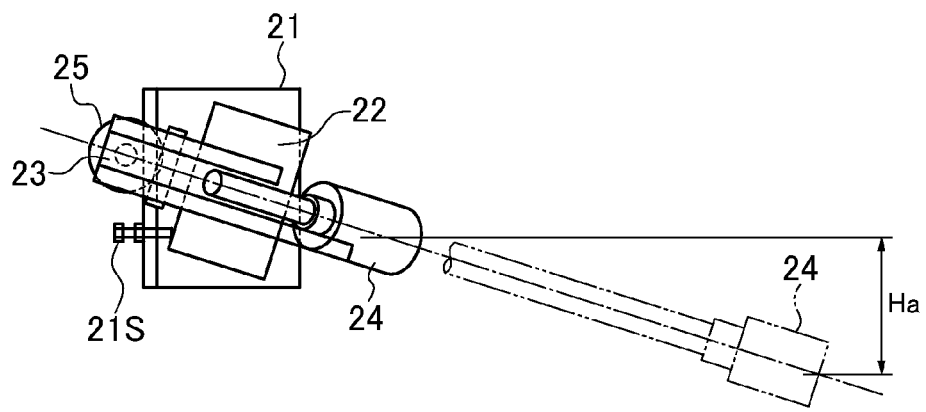
FIG. 7 is a view as seen from an arrow along a VII direction in FIG. 6.

Accordingly, in the rotation drive device 10, in each of the rotating units 20, when the swing support axis 23A of the support table 22 is in the side of the gravitational force acting region in which the weight 24 of the swing arm 23 comes down to the vertically lowest portion along the gravitational force utilizing rotating direction N from the vertically highest portion on the rotating track of the rotating unit 20, as shown in FIG. 6 and FIG. 7, with respect to the vertical surface including the rotating shaft 13, the swing center axis 23A of the swing arm 23 which is provided in the support table 22 oscillates at the angle $\alpha_0$ to the side to which the gravitational force acting on the weight 24 from the neutral position K on the surface which is orthogonal to the rotating shaft 13 is applied. In this oscillating state of the swing center axis, if the rotating unit 20 comes close to the weight protrusion start timing A mentioned above, the weight 24 is exposed to the swing auxiliary force caused by the gravitational force at a weight protrusion start timing A$\alpha$ before they run into the weight protrusion start timing A (before at the rotating angle $\alpha$ the weight protrusion start timing A), and starts the free-fall along the swing surface which forms the downward gradient (the head drop Ha) with respect to the horizontal surface around the swing center axis. At this time, if an appropriate protrusion fluid pressure is applied to the fluid cylinder, the free-fall mentioned above of the weight 24 starts, as shown in FIG. 7, from the weight protrusion start timing A$\alpha$ before the swing arm 23 of the rotating unit 20 and the weight 24 run into the weight protrusion start timing A, thereby quickening the weight protrusion start timing A. Since the protrusion start timing A of the weight 24 is quickened without depending on the thrust of the fluid cylinder, it is possible to enlarge the rotation energizing angle range La of the rotating shaft 13 in which the weight 24 is protruded to the maximum radial position in the gravitational force acting region and can obtain the rotating force caused by the rotating moment applying to the rotating shaft 13, and it is possible to improve the gravitational force utilization ratio of the rotation drive device 10.

Figure 8:
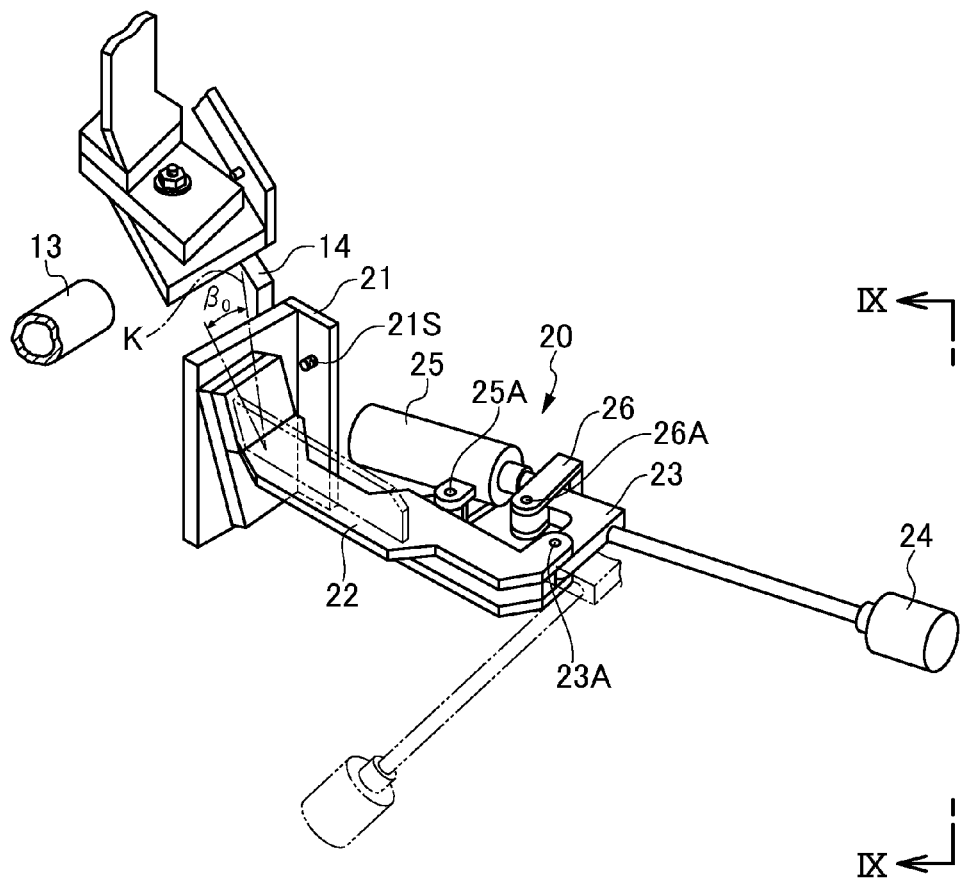
FIG. 8 is a perspective view showing the rotating unit in a weight retracting process.
Figure 9:
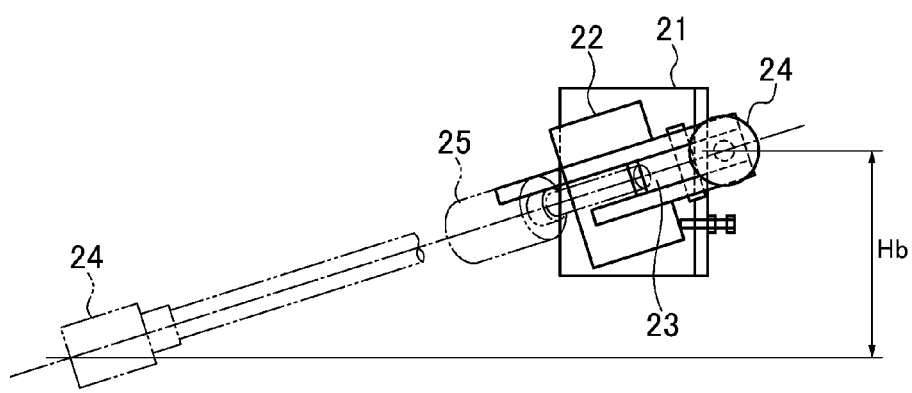
FIG. 9 is a view as seen from an arrow along a IX direction in FIG. 8.

Further, in each of the rotating units 20, even when the swing support axis 23A of the support table 22 is in a side of the opposite gravitational force acting region in which the weight 24 is lifted up toward the vertically highest portion from the vertically lowest portion with respect to the vertical surface including the rotating shaft 13, the swing center axis of the swing arm which is provided in the support table 22 oscillates at an angle $\beta_0$ to the side to which the gravitational force acting on the weight 24 is applied, from the neutral position on the surface which is orthogonal to the rotating shaft 13, as shown in FIG. 8 and FIG. 9. If the rotating unit 20 comes close to the weight retraction start timing B mentioned above in the oscillating state of the swing center axis, the weight 24 is exposed to the swing auxiliary force caused by the gravitational force, at a weight retraction start timing B$\beta$ before they run into the weight retraction start timing B (before at the rotating angle $\beta$ the weight retraction start timing B), and starts the free-fall along the swing surface which forms the downward gradient (the head drop Hb) with respect to the horizontal surface around the swing center axis. At this time, if an appropriate retraction fluid pressure is applied to the fluid cylinder, the free-fall mentioned above of the weight 24 starts from the weight retraction start timing B$\beta$ before the swing arm of the rotating unit 20 and the weight 24 run into the weight retraction start timing B, thereby quickening the weight retraction start timing B. Since the retraction start timing B of the weight 24 is quickened without depending on the thrust of the fluid cylinder, it is possible to reduce the rotating resistance angle range Lb of the rotating shaft 13 in which the weight 24 applies the rotating resistance force to the rotating shaft 13 while being protruded to the maximum radial position in the opposite gravitational force acting region, and it is possible to improve the gravitational force utilization ratio of the rotation drive device 10.

Figure 10:
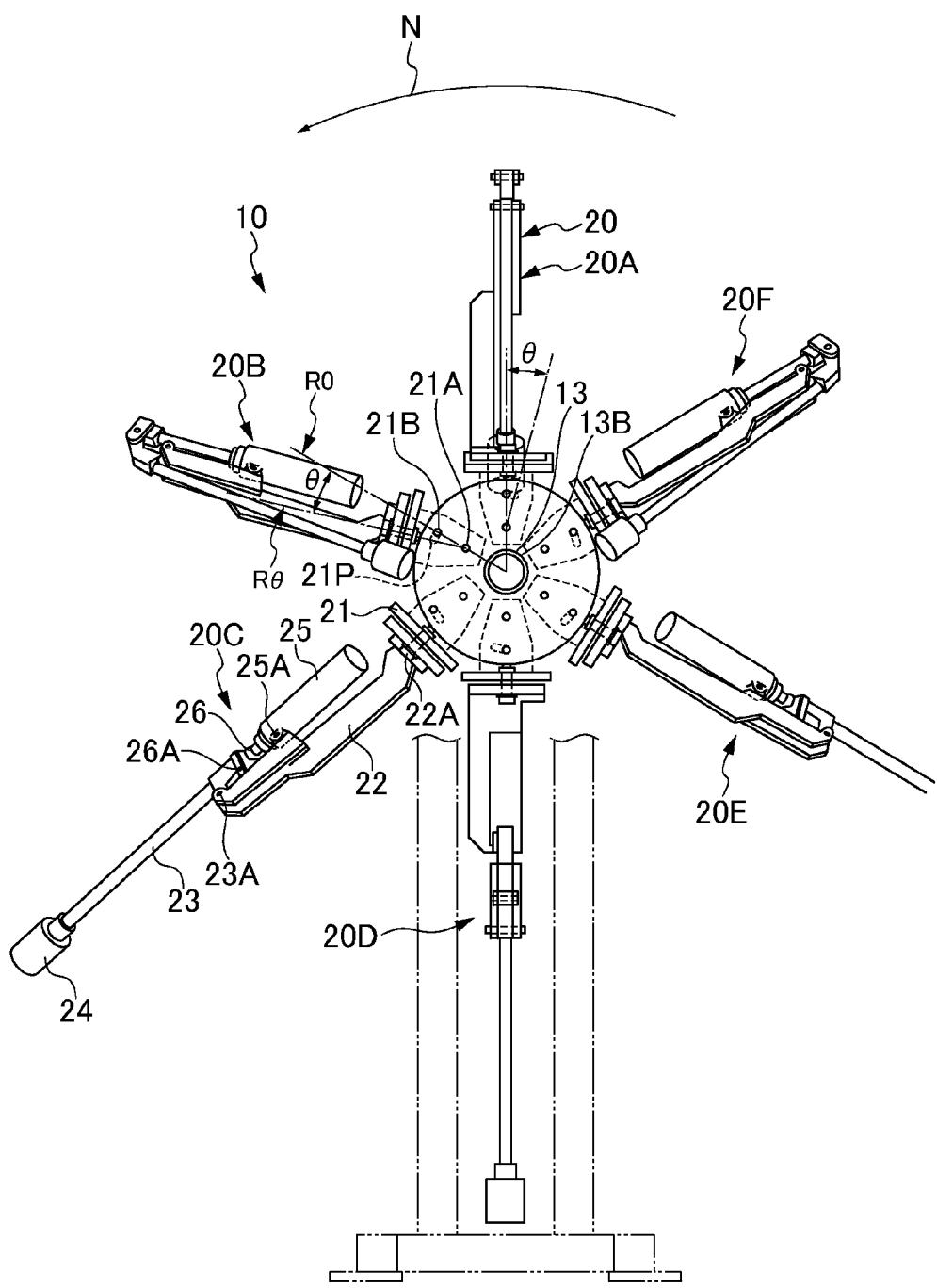
FIG. 10 is a whole perspective view showing a tilting structure of a base table.
Figure 11:
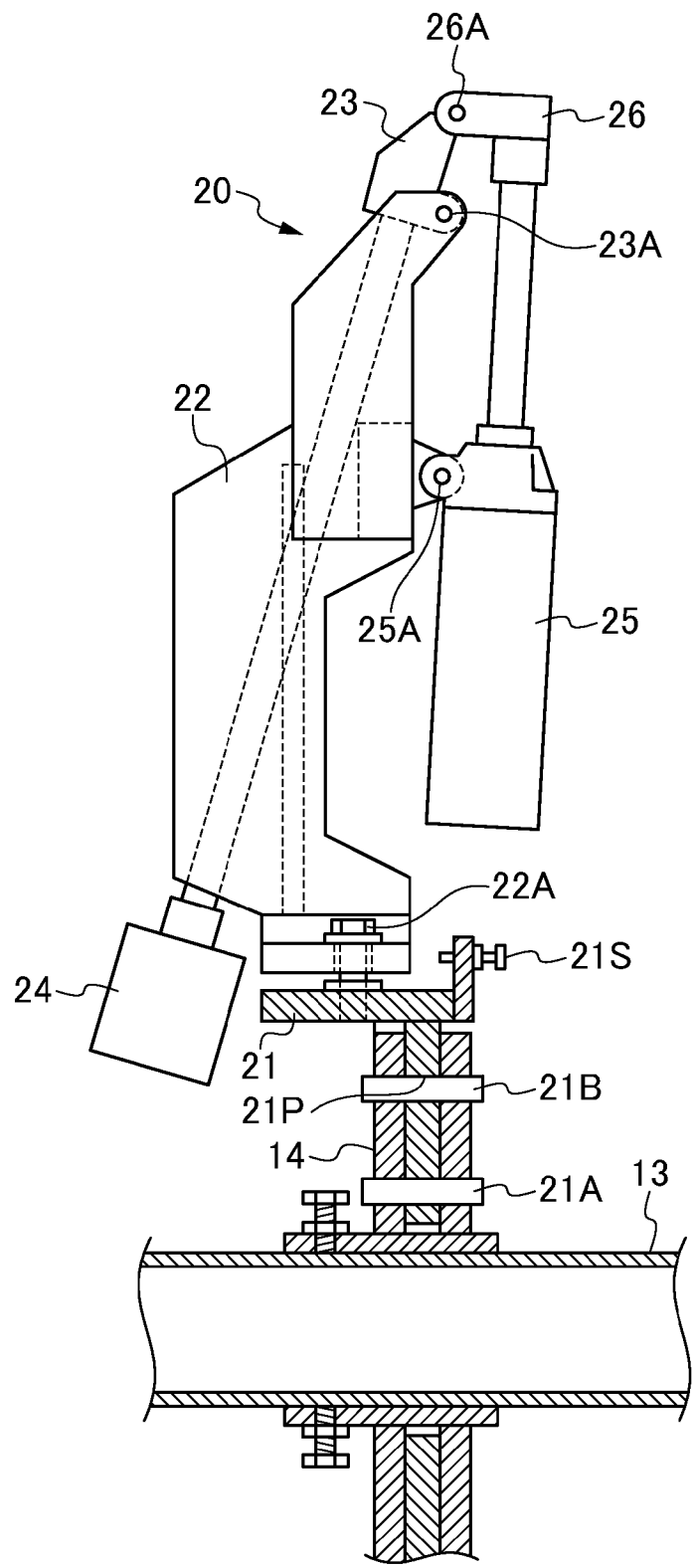
FIG. 11 is a cross sectional view showing the tilting structure of the base table.

(ii) Tilting Structure of Base Table 21 with Respect to Rotating Table 14 (FIG. 10 and FIG. 11)

A rotation drive device 10 in FIG. 10 and FIG. 11 is structured such that a tilting structure of the base table 21 is added to each of the rotating units 20 of the rotation drive device 10 shown in FIG. 1 to FIG. 9. In other words, in each of the rotation units 20, the base table 21 supporting the support table 22 and the swing arm 23 is attached in such a manner as to be tiltable from a reference position R0 at which the swing arm 23 is swingably along the surface including the rotating shaft 13, to a forward tilting position Rθ at which it moves at a fixed angle θ in the rotating direction N of the rotating shaft 13, around a tilt support axis 21A which is provided in the rotating table 14 and is provided along the rotating shaft 13. In the present embodiment, each of the rotating units 20, the tilt support axis 21A is fixed in a penetrating manner to an inner diameter side of two mutually spaced discs which construct the rotating table 14, and an engagement pin 21B is fixed in a penetrating manner to an outer diameter side of the discs. Further, one end of a tabular portion of the base table 21 which is inserted between two discs of the rotating table 14 is pivotally supported to the tilt support axis 21A, and an engagement pin 21B is inserted into a long hole 21P which is provided on a circular arc centering on the tilt support axis 21A in a side in which the support table 22 of the base table 21 is provided. The base table 21 has the tilt support axis 21A as a center of tilt, and can tilt in a range of the angle θ at which one end to another end along a circular arc of the long hole 21P comes into contact with the engagement pin 21B.

The base table 21 of each of the rotating units 20 is positioned at the reference position R0 mentioned above at which the one end side of the long hole 21P comes into contact with the engagement pin 21B, at a time when the weight 24 of the swing arm 23 is in the opposite gravitational force acting region (a right half portion of a vertical line passing through the rotating shaft 13 in FIG. 10) mentioned above on the rotating track of the rotating unit 20. On the other hand, the base table 21 is positioned at the forward tilting position Rθ mentioned above at which the another end side of the long hole 21P comes into contact with the engagement pin 21B, at a time when the weight 24 of the swing arm 23 is in the gravitational force acting region (a left half portion of the vertical line passing through the rotating shaft 13 in FIG. 10) mentioned above on the rotating track of the rotating unit 20.

Accordingly, in the rotation drive device 10, in each of the rotating units 20, when the weight 24 is in the side of the gravitational force acting region mentioned above, the base table 21 supporting the swing arm 23 and the support table 22 tilts from the reference position R0 to the forward tilting position Rθ. In accordance with this, the vertical position of the weight 24 begins to become lower in the subsequent swinging process in the weight protruding direction of the swing arm 23, at the weight protrusion start timing Aθ before the rotating unit 20 runs into the weight protrusion start timing Aα mentioned above (before at the rotating angle θ the weight protrusion start timing Aα), the weight 24 is exposed the swing auxiliary force caused by the gravitational force of the weight 24, and the free-fall can start. Accordingly, if an appropriate protrusion fluid pressure is applied to the fluid cylinder 25 at this time, the free-fall mentioned above of the weight 24 is started from the weight protrusion start timing Aθ before the swing arm 23 of the rotating unit 20 and the weight 24 run into the weight protrusion start timing Aα, thereby further quickening the weight protrusion start timing A mentioned above. Since the protrusion start timing of the weight 24 is further quickened without depending on the thrust of the fluid cylinder 25, it is possible to further enlarge the rotation energizing angle range La of the rotating shaft in which the rotating force can be obtained by the rotating moment which the weight 24 is protruded to the maximum radial position in the gravitational force acting region so as to apply to the rotating shaft, and it is possible to further improve the gravitational force utilization ratio of the rotation drive device 10.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, in each of the rotating units, the connecting point in the fluid cylinder side may be provided at a position at which the length of the arm from the swing center axis of the swing arm is shorter, via a connection link mechanism.

INDUSTRIAL APPLICABILITY

In accordance with the present invention, in the rotation drive device having a plurality of rotating units which obtain the rotating force by changing the radial position with respect to the rotating shaft of the weight by means of the fluid cylinder, it is possible to enlarge the rotating moment which the weight of each of the rotating units applies to the rotating shaft so as to obtain the great rotating force, while downsizing the stroke and the output of the fluid cylinder.

EXPLANATIONS OF LETTERS OR NUMERALS 10 rotation drive device
11 stand
13 rotating shaft
14 rotating table
20 rotating units
21 base table
21A tilt support axis
22 support table
22A oscillation support axis
23 swing arm
23A swing center axis
24 weight
25 fluid cylinder
30 fluid supply device
A, Aα, Aθ protrusion start timing
B, Bβ retraction start timing
N rotating direction
P1 protruding side range
P2 retraction side range
La rotation energizing angle range
Lb rotating resistance angle range
K neutral position
R0 reference position
Rθ forward tilting position

The invention claimed is:
1. A rotation drive device comprising:
a rotating shaft which is pivotally supported to a stand;
a rotating table which is fixed onto the rotating shaft;
a plurality of rotating units which are provided at a plurality of positions spaced along a rotating direction on the rotating table;
each of the rotating units including a support table which is supported to the rotating table, a weight which is supported to the support table, and a fluid cylinder which is attached to the support table and makes a radial position of the weight with respect to the rotating shaft controllable; and
the rotation drive device changing the radial position of the weight in each of the rotating units by sequentially supplying a fluid from a fluid supply source to the fluid cylinder of each of the rotating units, and rotating the rotating table and the rotating shaft on the basis of a fluctuation of a rotating moment which a gravitational force acting on the weight applies around the rotating shaft, each of the rotating units has a swing arm which is supported so as to be swingable around a swing center axis provided in the support table, the weight is provided at a position at which a length of an arm of the swing arm from the swing center axis is longer, and a connection point in the fluid cylinder side is provided at a position at which the length of the arm from the swing center axis is shorter, and wherein the support table provided with the swing center axis of the swing arm is supported so as to be swingable around an oscillation support axis which is provided in a base table attached to the rotating table and is orthogonal to the rotating shaft, and the swing center axis of the swing arm provided in the support table is swingable at a fixed angle to a side to which a gravitational force acting on the weight is applied, among both sides with respect to a neutral position positioned on a surface which is orthogonal to the rotating shaft.

2. A rotation drive device as claimed in claim 1, wherein in each of the rotating units, the fluid from the fluid supply source is controlled so as to be supplied to the fluid cylinder of each of the rotating units, in such a manner that a timing A at which the swing arm starts swinging in a direction of protruding the weight from a minimum radial position toward a maximum radial position with respect to the rotating shaft comes to a timing at which the swing arm of the rotating unit and the weight are near a horizontal surface including the rotating shaft, and a vertical position of the weight begins to become lower in a subsequent swinging process in the direction of the swing arm, and wherein in each of the rotating units, the fluid from the fluid supply source is controlled so as to be supplied to the fluid cylinder of each of the rotating units, in such a manner that a weight retraction start timing B which starts swinging in a direction of retracting the swing arm from the maximum radial position toward the minimum radial position comes to a timing at which the swing arm of the rotating unit and the weight are near the horizontal surface including the rotating shaft, and the vertical position of the weight begins to become lower in the subsequent swinging process in the direction of the swing arm.

3. A rotation drive device as claimed in claim 1, wherein the base table supporting the swing arm and the support table is attached in such a manner as to be tiltable from a reference position at which the swing arm is swingably along the surface including the rotating shaft to a forward tilting position which moves forward at a fixed angle in a rotating direction, around a tilt support axis which is provided in the rotating table and is along the rotating shaft.

4. A rotation drive device as claimed in claim 2, wherein the base table supporting the swing arm and the support table is attached in such a manner as to be tiltable from a reference position at which the swing arm is swingably along the surface including the rotating shaft to a forward tilting position which moves forward at a fixed angle in a rotating direction, around a tilt support axis which is provided in the rotating table and is along the rotating shaft.

* * * * *